United States Patent
Niemeyer et al.

(10) Patent No.: US 10,139,899 B1
(45) Date of Patent: Nov. 27, 2018

(54) HYPERCATCHING IN VIRTUAL REALITY (VR) SYSTEM

(71) Applicant: DISNEY ENTERPRISES, INC., Burbank, CA (US)

(72) Inventors: Gunter D. Niemeyer, Pasadena, CA (US); Matthew K Pan, Vancouver (CA)

(73) Assignee: DISNEY ENTERPRISES, INC., Burbank, CA (US)

( * ) Notice: Subject to any disclaimer, the term of this patent is extended or adjusted under 35 U.S.C. 154(b) by 0 days.

(21) Appl. No.: 15/827,011

(22) Filed: Nov. 30, 2017

(51) Int. Cl.
| G06F 3/01 | (2006.01) |
| G06T 3/20 | (2006.01) |
| G06T 7/20 | (2017.01) |
| A63F 13/25 | (2014.01) |
| A63F 13/816 | (2014.01) |
| A63F 13/211 | (2014.01) |

(52) U.S. Cl.
CPC ............ *G06F 3/011* (2013.01); *A63F 13/211* (2014.09); *A63F 13/25* (2014.09); *A63F 13/816* (2014.09); *G06T 3/20* (2013.01); *G06T 7/20* (2013.01); *A63F 2300/8082* (2013.01); *G06T 2207/30241* (2013.01)

(58) Field of Classification Search
None
See application file for complete search history.

(56) References Cited

U.S. PATENT DOCUMENTS

| 7,642,989 | B2 | 1/2010 | Cheong et al. |
| 8,617,008 | B2 * | 12/2013 | Marty ................. G06T 7/70 273/317 |
| 9,122,391 | B2 | 9/2015 | Lee et al. |
| 9,345,957 | B2 | 5/2016 | Geisner et al. |
| 9,370,704 | B2 | 6/2016 | Marty |
| 9,380,177 | B1 | 6/2016 | Rao et al. |
| 9,558,592 | B2 | 1/2017 | Mullins et al. |

(Continued)

OTHER PUBLICATIONS

Hong, Sungkwan, et al, "Investigation of Prediction Model for Ball Catching Task Using VR Technology," SICE Annual Conference in Fukui, Aug. 4-6, 2003.

(Continued)

*Primary Examiner* — Jeffrey Chow
(74) *Attorney, Agent, or Firm* — Marsh Fischmann & Breyfogle LLP; Kent A. Lembke

(57) ABSTRACT

A system designed to provide a dynamic physical interaction for a user during a virtual reality (VR) experience in a VR experience space. The system includes a VR system having a headset with a display screen and a VR rendering module generating a video output, and the display screen displays an image of a virtual world using the video output. The system includes an object delivery system delivering a physical object into the VR experience space to move toward or near to the user wearing the headset. The system includes, in the VR system, an interaction module generating a predicted trajectory for the physical object in the VR experience space. The image of the virtual world includes a virtual object corresponding to the physical object, and the image of the virtual object follows a virtual object trajectory in the virtual world differing from the predicted trajectory for the physical object.

19 Claims, 7 Drawing Sheets

(56) References Cited

U.S. PATENT DOCUMENTS

| | | | |
|---|---|---|---|
| 2011/0053688 A1* | 3/2011 | Crawford | A63D 5/04 |
| | | | 463/31 |
| 2014/0002493 A1* | 1/2014 | Mitchell | G06T 13/20 |
| | | | 345/633 |
| 2015/0296272 A1* | 10/2015 | Sonabend | A61H 99/00 |
| | | | 725/32 |
| 2016/0342218 A1 | 11/2016 | Burba et al. | |
| 2017/0103581 A1 | 4/2017 | Mullins et al. | |
| 2017/0115488 A1 | 4/2017 | Ambrus et al. | |
| 2017/0151484 A1* | 6/2017 | Reilly | A63B 71/0622 |
| 2017/0307333 A1* | 10/2017 | Northrup | F41A 33/00 |

OTHER PUBLICATIONS

Fink, Philip W., et al, "Catching Fly Balls in Virtual Reality: A Critical Test of the Outfielder Problem," NIH Public Access, Nov. 4, 2013.

Pan, Matthew K.X.J, et al, "Catching a Real Ball in Virtual Reality," IEEE Virtual Reality (VR), Mar. 18-22, 2017.

* cited by examiner

HYPERCATCHING IN VIRTUAL REALITY (VR) SYSTEM

BACKGROUND

1. Field of the Description

The present description relates, in general, to virtual reality (VR) systems and their uses to generate unique user experiences, and, more particularly, to systems and methods for providing the user of a VR system with an ability to experience playing catch including the physical sensations or haptic interactions of catching an object (e.g., a ball) and, in some cases, throwing the object, while the VR user/player is experiencing a VR world or environment provided by the VR system.

2. Relevant Background

There is a growing interest in virtual reality (VR) games and applications in the entertainment and education industries. VR typically refers to computer technologies that use virtual reality headsets (or head mounted displays (HMDs)) to generate realistic images, sounds, and other sensations that replicate a real environment or create an imaginary setting. VR also simulates a user's physical presence in this environment. VR has been defined as a realistic and immersive simulation of a three-dimensional 360-degree environment, created using interactive software and hardware, and experienced or controlled by movement of the body or as an immersive, interactive experience generated by a computer.

A person using virtual reality equipment is able to "look around" the artificial world, and, with higher quality VR systems, move about in it and virtually interact with features or items depicted in the headset. A virtual world or environment (or its associated imagery) is displayed with a virtual reality headset. VR headsets may include head-mounted goggles with a screen in front of the eyes. Programs may include audio and sounds through speakers or headphones so that the user can hear the virtual world, too.

Generally, though, the user can only "virtually" interact with objects they can see within the displayed virtual world of the headset and cannot touch or feel the virtual objects because the virtual objects do not exist in the real world. In some cases, advanced haptic systems, in which the VR user wears gloves, holds a game or other controller, and/or wears haptic clothing or a suit, may provide the user with some tactile information such as for use in medical, video gaming, and military training applications. Similarly, some VR systems used in video games can transmit vibrations and other sensations to the user through the game controller, but these feedback devices still do not allow a user to feel and touch the virtual objects. Hence, the user experiences a sensory inconsistency between what they can see and hear in the virtual world and what they perceive with their sense of touch, and the VR users are reminded or made aware of the artificial nature of any virtual world provided by existing VR systems.

SUMMARY

Briefly, a system (and corresponding method) is described herein that provides a user of a modified virtual reality (VR) system with physical interactions with an object in the real world or in the surrounding physical space while they are concurrently interacting in the virtual world with a corresponding virtual object. The real world object is dynamic in that it may be a ball or other object flying or moving through the space in which the user is positioned, and the system includes an object delivery assembly for delivering the object in a predictable manner (e.g., dropping, shooting, throwing, propelling, or the like the object within the physical space that may be thought of as the VR experience space).

For example, the object may be a tennis ball and the object delivery assembly may take the form of a tennis practice server that tosses or propels tennis balls with a predictable trajectory toward the VR user/player (or into the VR experience space) in response to control signals from the VR system. The VR system may be operated to display the virtual object in a manner that causes the VR user/player to move their hand (or other receiving/contact portion of their body that is tracked by the VR system) in the VR experience space so as to catch or receive the flying real world object. The catching time is accurately synchronized by the VR system with a time of an interaction event (e.g., a catch (or a release if throwing) of the virtual object) occurring in the virtual world being created by the VR system.

More particularly, a system is described that is designed to provide a dynamic physical interaction for a user during a virtual reality (VR) experience in a VR experience space. The system includes a VR system having a headset with a display screen and a VR rendering module generating a video output, and the display screen displays an image of a virtual world based on the video output. The system also includes an object delivery system delivering a physical object into the VR experience space to move toward or near to the user wearing the headset. Further, the system includes, in the VR system, an interaction module generating a predicted trajectory for the physical object in the VR experience space. The image of the virtual world includes an image of a virtual object corresponding to the physical object (e.g., the virtual object may take on a very similar or matching image as the real world object or may be a modified or even completely different object in the VR experience space), and the image of the virtual object follows a virtual object trajectory in the virtual world that differs at least in one aspect from the predicted trajectory for the physical object in the VR experience space (e.g., differing speed(s), differing path(s), or the like).

In some embodiments, the interaction module includes a trajectory prediction algorithm generating the predicted trajectory based on design parameters and location of the object delivery system and based on physical characteristics of the physical object. In such embodiments, the system may further include a tracking mechanism tracking movement of the physical object in the VR experience space, and the trajectory algorithm updates the predicted trajectory by processing the tracked movement.

In some implementations of the system, the VR system has a latency in generating the video output, and the video output is generated using forward rendering of the virtual object on the virtual object trajectory to correct for the latency. In these or other implementations, the headset has position mis-calibration of the displayed image, and the virtual object trajectory is generated to reposition the virtual object in the virtual world based on the position mis-calibration. The virtual object trajectory may include a travel path for the virtual object in the virtual world that differs from a travel path for the physical object defined by the predicted trajectory for the physical object in the VR experience space. In the same or other cases, the virtual object trajectory includes at least two velocities for the virtual object along a travel path, and at least one of the two velocities differs from a velocity for the physical object defined in the predicted trajectory for the physical object in the VR experience space (e.g., to provide time morphing effects such as bullet time for the virtual object).

In some useful embodiments, the VR system further includes a tracking mechanism for tracking a movement of a body part of the user or of a physical object worn or held by the user, and the virtual object trajectory is modified in response to the tracked movement, whereby the VR system operates to guide the user to interact with the physical object in the VR experience space. Further, it may be useful in the system for the virtual object trajectory to be time synchronized with the predicted trajectory, whereby a virtual interaction between the user and the virtual object in the virtual world occurs simultaneously with a physical interaction between the user and physical object in the VR experience space.

DETAILED DESCRIPTION

Figure 1:
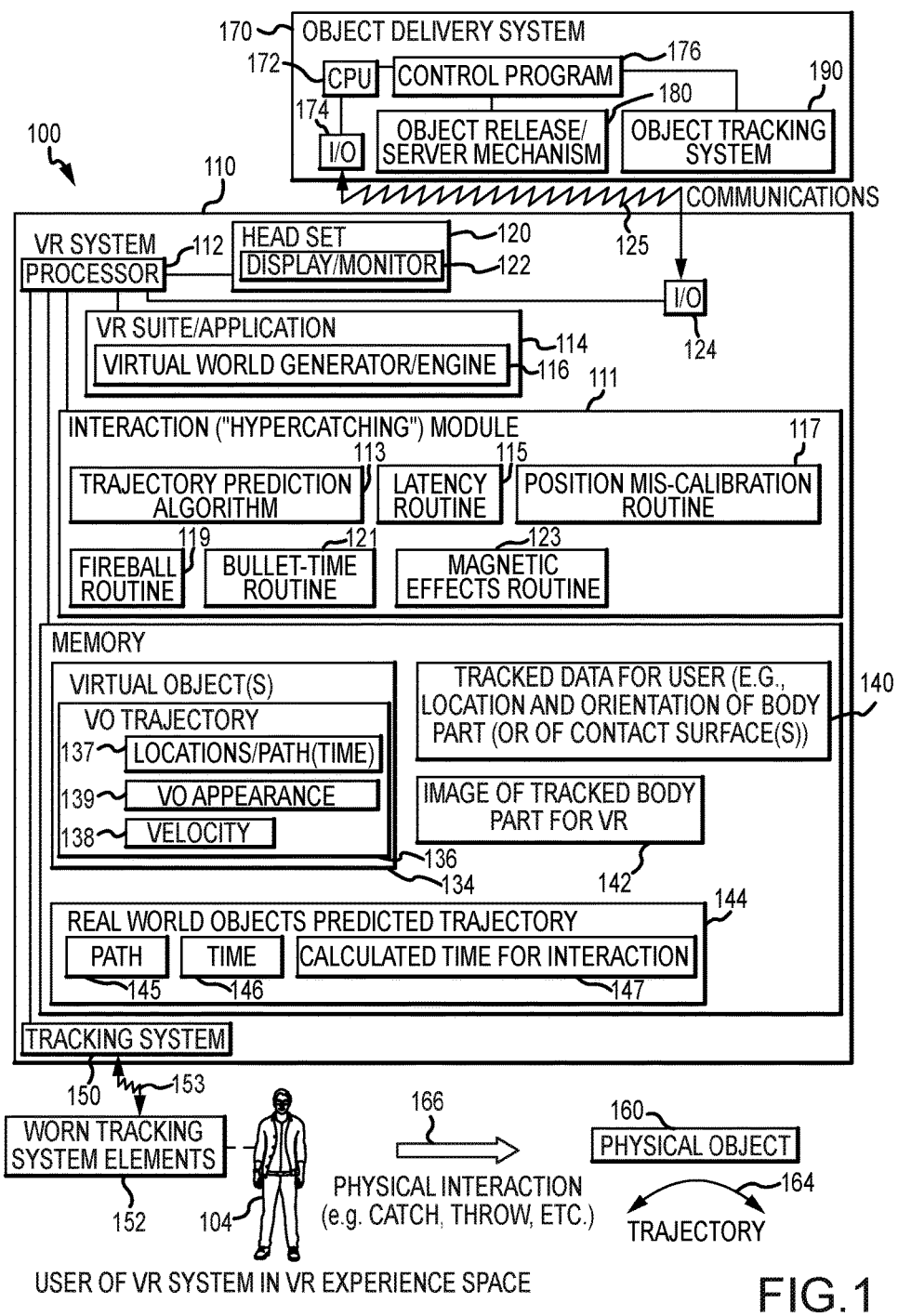
FIG. 1 is a functional block diagram of a system for providing a user of a VR system with physical interaction experiences (such as catching, throwing, contacting, and the like a physical object such as a ball) that are synchronized with events or activities being generated in a VR world or environment by the VR system.

A system or assembly is described herein that uses a VR system, which is modified to include a hypercatching (or, more generally, "interaction") module, along with an object delivery system. The new system is adapted to improve physical interactions of a user of the VR system with dynamic objects within a VR world and within the VR experience space in which the VR system user is presently positioned. The physical interactions include catching objects in the VR experience space. "Catching" may be with the user's hand(s) or other body part (e.g., a foot when playing soccer in the virtual world), with a handheld tool (e.g., equipment used in a real or virtual world sport and so on), and/or with a worn or held item on a receiving surface of the user's body. In other embodiments, the physical interactions may include throwing objects, kicking or hitting an object with a body part or a worn or held tool or piece of equipment, and other interactions.

In catching embodiments, the system is adapted to operate so as to make catching in VR easier, more realistic, and/or more entertaining through prediction and feedback. The system (and implemented hypercatching method) is designed to adjust for distortion of the virtual space (e.g., mis-calibration of the head-mounted display and motion capture system) and for user movement errors (e.g., a user moves their hand too far to the left or right or up and down when catching an incoming object). In other words, the system allows tweaking of virtual representations of physical objects based on a priori knowledge as well as real time feedback to the VR user/participant to improve catching performance and fidelity.

The system may be configured (e.g., with software/executable code) to give virtual objects super-natural (or non-physical) properties prior to being caught (i.e., while in flight or upon impact with the VR participant's receiving surface/body part). For example, a physical object can be tossed toward the VR participant (e.g., by an object delivery system) and a corresponding virtual object in the VR world displayed to the VR participant can fly in spirals (rather than a linear or arced path), can slow down and/or speed up in space during flight, and "boomerang" back to the VR participant. In some system implementations, the VR participant/user is given super-natural abilities such as perfect aim when throwing the object, "magnetic hands" so they can catch without grabbing the object or the like, the ability to juggle without knowing how to juggle, and so on.

The hypercatching module may include a prediction routine/algorithm to provide trajectory prediction for the physical (or real world) object through the VR experience space (e.g., upon release from the object delivery system/assembly) toward the VR user. Then, the hypercatching module can provide this trajectory prediction to the virtual world generator/engine for use in rendering the corresponding virtual object with alternate appearance and/or alternate object trajectories in the VR world. The alternate object trajectories may be designed to help and/or alter the way the physical object is caught by the VR user. Alternatively, the system can be configured to respond to tracked user motion by altering the virtual object's trajectory to encourage the VR user to move so as to have an improved opportunity to catch the real world object (or place the receiving surface of their body, worn equipment/tool, or held equipment/tool into the predicted trajectory for the real world object). The alternate object trajectories may be generated so as to be fantastical or impossible for the corresponding real world object while still being designed to allow and facilitate the VR user to catch (or make contact with) the real world object in the VR experience space.

The hypercatching module uses the trajectory prediction algorithm to determine or to "know" where and when the physical object will be in the future. One interesting difference between the system described herein and prior VR systems is that it does not require faithful reproduction of the real dynamic object's path in the VR world to enable catching and other physical interaction. In fact, the system is designed to exploit virtual reality to deliberately distort and/or modify the real world object's trajectory (and, often, appearance) to make the real world object easier to catch such as when there is mis-calibration between the real and virtual object or to provide (e.g., generate and render) a trajectory in the VR world that cannot possibly exist in the real world. For example, path and time information from predictable (predicted) trajectories can be used by the new system to provide users with a more captivating VR experience, which may appear to defy the normal constraints of physical laws.

Prior to turning to specific examples and/or implementations, it may be useful to discuss more generally the components and processes that may be used to provide a user of a VR system with a physical interaction experience to increase the quality of the VR world or experience (or to make the VR experience "more real"). This physical interaction experience may involve catching (or otherwise receiving), throwing, or contacting (e.g., kicking, hitting, clubbing, and the like) a physical or real world object such as a ball, a physical item hag corresponding in some way with a VR object, and the like.

FIG. 1 illustrates a functional block diagram of a system 100 for inserting physical interaction experiences into a VR world for a user 104 of a VR system 110 in a VR experience space. Particularly, during operations of the system 100, a user 104 of the VR system 110 is able to have physical interactions 166 (such as catching/receiving and/or throwing) with a physical or real world object 160 (e.g., a ball or the like). The object 160 is shown to be moving with a trajectory 164 (along a path (or over particular locations) at a particular velocity to be at locations in the VR experience space at particular times). The trajectory 164 is preferably predictable such as along a vertical path if the object 160 is dropped from above the user 104, along a horizontal path if rolled toward the user 104, and/or along an arcuate path if pitched, tossed, or projected/propelled toward the user at a launch angle greater than zero degrees such as in the range of 30 to 60 degrees or the like.

To this end, the system 100 includes an object delivery system/assembly 170 with a processor/controller 172 running a control program/software 176 and managing input/output (I/O) devices 174 for communicating (in a wired or wireless manner) as shown with arrows 125 with I/O devices 124 of the VR system 110. Particularly, the communications 125 may include control signals from the VR system 110 to trigger release or launching (or tossing, serving, pitching, or other delivery) of the object 160 into the VR experience space by an object release/server mechanism 180. The mechanism 180 may be relatively simple when the object 160 is dropped from a height above the user 104 in the VR experience space. In other cases, the mechanism 180 may take the form of a tennis practice server, a baseball or softball pitching machine, or the like to launch, pitch, toss, or otherwise send the object 160 flying toward the user 104 following a trajectory 164. In some embodiments, the mechanism 180 may take the form of or be replaced by one or more human operators that manually drop, release, or otherwise deliver (pitch) the object to user 104 following a desired trajectory 164.

In some embodiments, the object release/server mechanism 180 has operations that are very repeatable such that a trajectory 164 of the object 160 is known (such as through testing and measuring of results during trial runs of the mechanism 180). In other cases, the operating parameters and settings of the mechanism 180 (along with characteristics of the object 160 such as size, weight, and shape) are provided to the VR system 110 for calculating or predicting the trajectory 164 of an object. In other cases, though, it may be useful to include an object tracking system/device 190 as part of the system 100 (in the object delivery assembly 170 as shown or as part of the VR system 110 in some embodiments). The tracking system 190 may include components on the object 160 to facilitate tracking and may take nearly any useful design of movement tracking (or motion capture) devices known in the art to practice the system 100 (such as those used in many interactive video games such as Kinect, PlayStation Move, Wii, and the like). Output of the tracking system 190 may be communicated 125 to the VR system 110 for use in predicting a trajectory as shown at 144 with a trajectory prediction algorithm/routine 113 of the interaction (or "hypercatching") module 111.

The VR system 110 includes a processor 112 that executes code or programming to provide the functionality of a VR suite or application 114 and also executes code or programming to provide the functionality of the interaction module 111. The VR system 110 includes a headset (or headgear/eyewear) 120 that is worn by the user 104 during operations of the system 100. The headset 120 includes a display or monitor 122 that is operated by the processor 112 and VR suite/application 114 to display imagery or images generated by a virtual world generator/engine 116 of the VR suite/application 114. While such images are displayed, the user 104 typically has their vision of the surrounding physical environment or space blocked and can only see the VR images or VR world/environment provided by the VR suite/application 114.

The VR system 110 further includes input/output (I/O) devices 124 for allowing a user 104 to initiate and end operations of the VR system 110 (e.g., to start or stop the VR suite/application and its creation of a VR experience). The I/O devices 124 may include wired or wireless communication devices for transmitting messages 125 to I/O devices 174 of the object delivery system 170, and such communications 125 are typically used to share tracking data on the real world object 160 from the object tracking system 190 and to trigger operations of the object release/server mechanism 180 to deliver/project the real world object 160 into the VR experience space and toward user 104 for catching or other physical interaction. The timing of such control signals 125 typically is synchronized with an event in the VR world being concurrently generated (or that is generated/initiated at or after triggering of release by the mechanism 180) by the virtual world generator/engine 116.

The VR system 110 includes or has access to memory 130 (with access managed by processor 112). The VR system 100 runs an interaction ("hypercatching") module 111 that includes a trajectory prediction algorithm 113 that operates to process object parameters/qualities for object 160, operation parameters for the object release/server mechanism 180, triggering signals 125, and/or tracking data from object tracking system 190 to calculate or predict a real world object's trajectory 144 that is stored in memory 130. The predicted trajectory 144 may include a travel path 145 for the real world object 160 through the VR experience space toward or to the user 104. The predicted trajectory 144 may also include speed/velocity of the object 160 and/or the time 146 the object 160 will be at each location along the path 145. The predicted trajectory 144 may further include a calculation of an estimate time for interaction 147 between the real world object 160 and the user 104 (e.g., when will the object 160 be caught, received, contacted, struck, or the like by the user 104 (or by a piece of equipment held or worn by the user 104).

The predicted trajectory 144 may be used by the interaction module 111 and/or the virtual world generator 116 to create a trajectory 136 for a virtual object (VO) 134 that is created and rendered for display to the user 104 in the VR world and that corresponds with the real world object 160. The VO trajectory 136 may be used to define the locations or path of the VO 134 in the virtual world (or the location of the VO at each point in time that the real world object 160 is following the trajectory 164 prior to the physical interaction with the user 104). The VO trajectory may also be used to define the speed or velocity 138 at which the VO 134 travels through the virtual world. A design criteria for the interaction module 111, in this regard, may be for the VO 134 to be displayed to the viewer 104 in the head set's display 122 as arriving at a location of the user 104 or a tracked body part (such as their hand) or catching/hitting equipment simultaneously (or in a time synchronized manner) with the real world object.

Instead of simply having the VO trajectory 134 match the predicted trajectory 144 of the real world object 160, it often is desirable to have the VO trajectory 134 and appearance 139 of the VO 134 differ from the trajectory 164 and/or appearance of the object 160. Physics of the real world can be suspended in the virtual world while still allowing the user 104 to catch or otherwise interact with the object 160. To this end, the interaction module 111 may include routines or software packages that can be called by the interaction module 111 or the virtual world generator 116 to generate special effects including creation of a unique VO trajectory 136.

Exemplary routines/software packages and their operations to provide unique physical interactions are discussed below but, briefly, may include (as shown in FIG. 1): a latency routine 115 (modify VO rendering to account for system latencies); a position mis-calibration routine 117 (modify VO rendering to account for issues with VR headset display (such as its lenses) in accurately displaying the VO to the user); a fireball routine 119 (modify appearance of VO to vary it from the real world object's appearance or modify the path/trajectory of the VO to vary it from the real world object's path/trajectory); a bullet-time routine 121 (morph time by having the VO that is rendered to move slower and/or faster than real world object but still arrive at same time in displayed VR world); and a magnetic effects routine 123 (display a VO that can fly through the VR world and be magnetically attached and released from the VR user's arm, hand, or other body part or handheld/worn piece of equipment).

The VR system 110 includes a tracking system 150 combined with tracking elements (such as a tracking glove) 152 that are worn by the user 104. Particularly, the user 104 wears the elements 152 on or near contact surface or on a body part that is the target for the physical interaction 166 (such as the palm of one or both of the user's hands, the user's foot, and so on) with the physical object 160. In other cases, the tracking elements 152 may be placed on a piece of equipment held or worn by the user 104 to interact physically (catch, strike, magnetically capture, and the like) with the object 160. The tracking data 153 is collected and processed by the tracking system 150 to determine or generate a set of tracked data 140 that is stored in memory 130, and this may include a location and, in some cases, orientation of a body part (e.g., a hand) of the user 104 (or of the contact surfaces for that body part). Additionally, the head set 120 typically will be configured with tracking hardware and/or software such that the tracked data for the user 140 may include information that indicates which way the user is looking or what they are looking at, and this head tracking information 140 may be used to facilitate the physical interaction (e.g., by delivering the object 160 with the object delivery system 170 from a direction matching that observed by the user 104 or only pitching or otherwise delivering the object 160 when the user 104 is looking in a predefined direction/location to increase the chances for a successful interaction (e.g., catching a ball 160)).

The virtual world generator/engine 116 may be configured to generate an image of the tracked body part (or tracked piece of held or worn interaction equipment such as a tennis racket, a bat, a science fiction or fantasy tool or weapon, or the like) for the virtual world as shown at 142 in memory 140, and this image 142 would be presented to the user 104 via imagery displayed on the display/monitor 122 of the headset 120. For example, the user 104 may be able to see an image of their hand or other monitored body part in the virtual world, and, due to the tracking by system 150, the virtual hand/body part's image 142 moves in the virtual world with orientation and speed that matches that of their physical hand/body part. The interaction module 111 can be adapted to trigger the physical interaction 166 (such as catching a ball) by sending a control signal 125 to the object delivery system 170 to deliver an object 160 when the user's tracked body part/contact surface is properly positioned at a particular point along a story timeline for the virtual world or can be adapted to better support interaction 166 such as by modifying the displayed virtual object 134 or its VO trajectory 136 to urge the user 104 to move their tracked hand or receiving surface/equipment to be in a position or orientation based on the predicted trajectory 144.

A definition of a virtual object 134 is stored in memory 130, and the generator/engine 116 uses this definition to insert an image of the virtual object 134 that corresponds (exactly or loosely) with the physical or real world object 160 into the virtual world/environment being provided to the user 104 on the headset display/monitor 122. The virtual object 134 may have a state or status 136 defined for it at each point in time in the virtual world/reality, and the state 136 may include the location 137 (present path and direction of travel and so on) of the virtual object 136 in the virtual world or space (which allows calculation of a distance between the virtual representation of the user's body part/contact surface and the virtual object 134 in the virtual world), the appearance 139 of the virtual object 136 (which may match that of the object 160 or differ to suit the virtual world such as taking the form of a fireball rather than a conventional tennis ball), and the present velocity 138 of the virtual object 136 in the virtual world (which allows determination of when the physical interaction 166 should occur which typically coincides with the calculated time for interaction 147 generated from or as part of the predicted trajectory 144).

Figure 2:
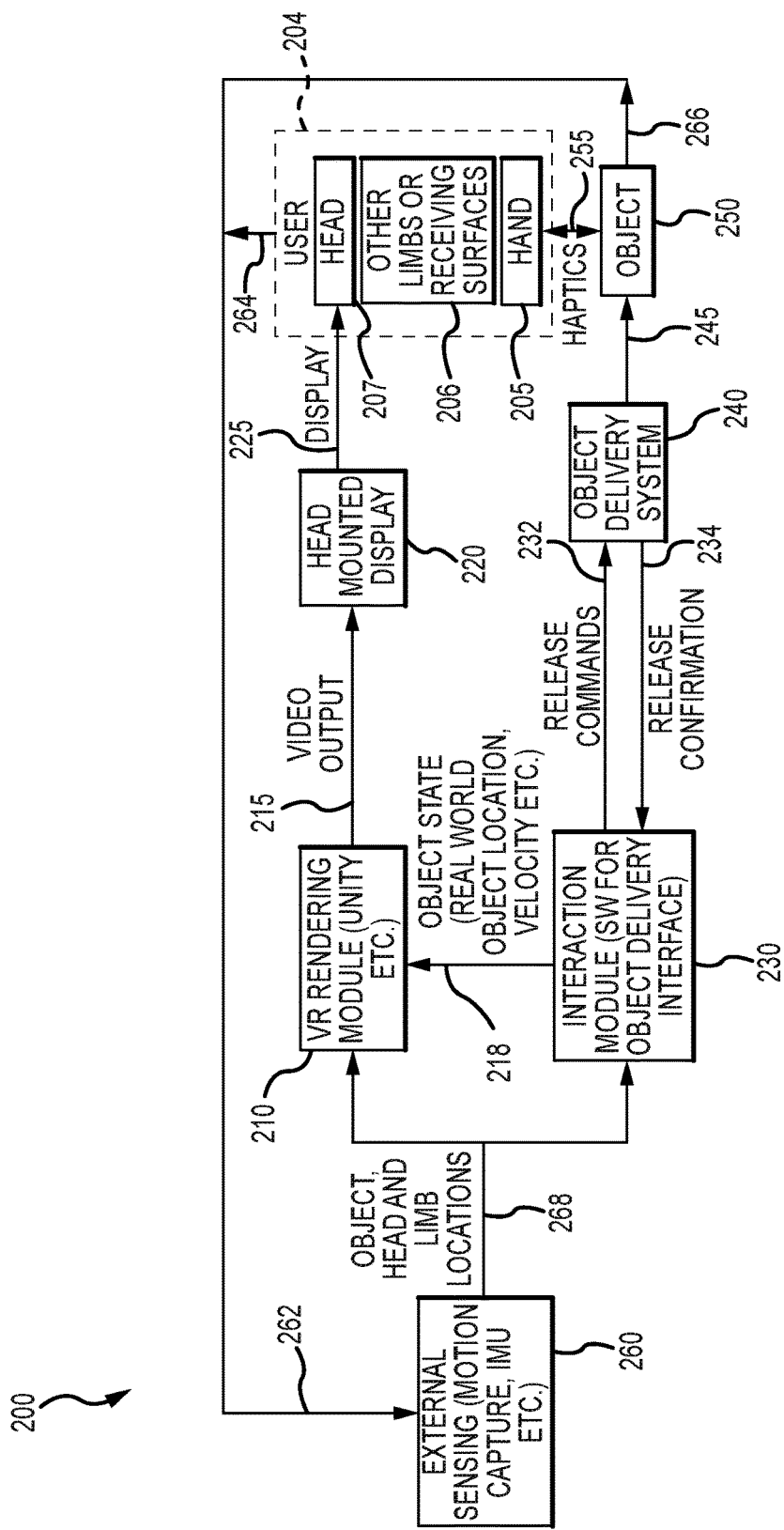
FIG. 2 illustrates a functional block diagram of another implementation of a system of the present description useful for providing physical interactions to a user of VR system that are synchronized with interaction events in the VR world provided by the VR system.

FIG. 2 illustrates a functional block diagram of another implementation of a system 200 of the present description useful for providing physical interactions to a user of a VR system that are synchronized with interaction events in the VR world provided by the VR system. The system 200 may include components similar to or different from those of the system 100 and may be operated to provide the VR experience with physical interactions as shown in the following figures.

As shown, the system 200 is operated to provide a unique VR experience with physical interactions for a VR user 205 including catching a ball or other physical object 250. The user 204 has the location, movement, and/or orientation of their hand(s) 205, other limbs/body parts/contact surfaces (which may be provided on worn or held equipment such as a racket or fantastical sporting implement, tool, or weapon) 206, and/or head 207 tracked by collection of tracking data 262 such as including information 264 from tracking elements on the hand 205, limbs/receiving surfaces 206, and head 205 by a tracking system 260. The tracking system 260 may be configured for external sensing such as with motion capture, with an IMU (inertial measurement unit), or the like. This tracked information is processed and provided to the VR rendering module 210 and interaction module 230 as shown at 268 for their use, respectively, in generating a VR world and in controlling an object delivery system 240 to provide desired physical interactions with the user 205.

The VR system portion of the system 200 includes a VR rendering module 210 (such as a VR application available from Unity or the like), which generates a video output 215 (images of a VR world) in part based on tracking data 268 of the user 204 as well as of the physical object 250 (in some cases). More typically, though, the VR rendering module 210 generates (or an interaction module 230 renders) the virtual object based on a virtual object trajectory (and with differing appearance from the physical object 250 in many cases) that differs from the tracked trajectory of the object 250 or of a predicted trajectory for the object 250, except for at the point in the real world object trajectory where physical interaction 255 occurs with the user 204 in the VR experience space. The virtual object trajectory does not have to follow physics or natural restrictions and may be generated to provide one or more special effects such as a non-linear/arcuate path, time morphing, and the like and/or may be generated to correct for latency and or position mis-calibration to facilitate successful physical interaction (such as catching a ball by encouraging the user 204 to move their hand 205 to the correct location in the VR experience space to be in the true path of the object 250).

The video output 215 is provided to a head mounted display (HMD) 220 that is worn by the user 204 on their head 207, and the HMD 220 includes a screen for providing a display 225 generated from the video output 215 from the VR rendering module 210. As discussed above, the VR rendering module 210 is configured to display virtual images of the user 204 such as of their hand 205 or other limbs/equipment with receiving surfaces 206 that are to be contact surfaces for a physical interaction with a physical object 250. The module 210 also displays an image of a virtual object in the video output 215 that corresponds to the physical object 250 but that may differ in appearance and its trajectory and that is caused to be located, oriented, and moved in the VR world provided in the video output to suit a particular VR world storyline and to support one or more interaction events.

The system 200 includes the interaction module 230, which may include software for an object delivery system interface. The module 230 is configured to output real world object state information 218 to the VR rendering module 210 that may define a tracked location or predicted location (or trajectory) of the real world object 250 in the VR space (corresponding to a virtual object in video output 215 used to create the VR world being provided in display 225 to the user 204). The object state information 218 may also include the present velocity of the tracked object (again, corresponding to a virtual object rendered in video output 215). Additional information in the state information 218 may include the timing and location of an upcoming interaction event in the VR experience space for use in synchronization of movement of the virtual object by VR rendering module to provide a haptic or physical interaction 255 between the user 204 and the object 250.

The interaction module 230 further receives as input tracking data 268 from the external sensing-based tracking system 260. The tracking data 268 may include the tracking data from the user 204 (such as a location of one or more contact surfaces on the hand 205, the limbs 206, and the head 207 or the like). The interaction module 230 may facilitate synchronization of the VR world (or video output 215) with operation of the object delivery system 240 to deliver/propel the object 250 into the VR experience space with an object release/server mechanism of the object delivery system 240 upon an event in the VR world storyline, upon the user's tracked data 262 indicating a desired positioning of the user's hand 205, the user's head 207, and/or the user's receiving surfaces 206, or in response to another object-release triggering event. In response to such a triggering event, the interaction module 230 transmits delivery commands 232 to the object delivery system 240 receives feedback 234 indicating when release as commanded has occurred.

Figure 3:
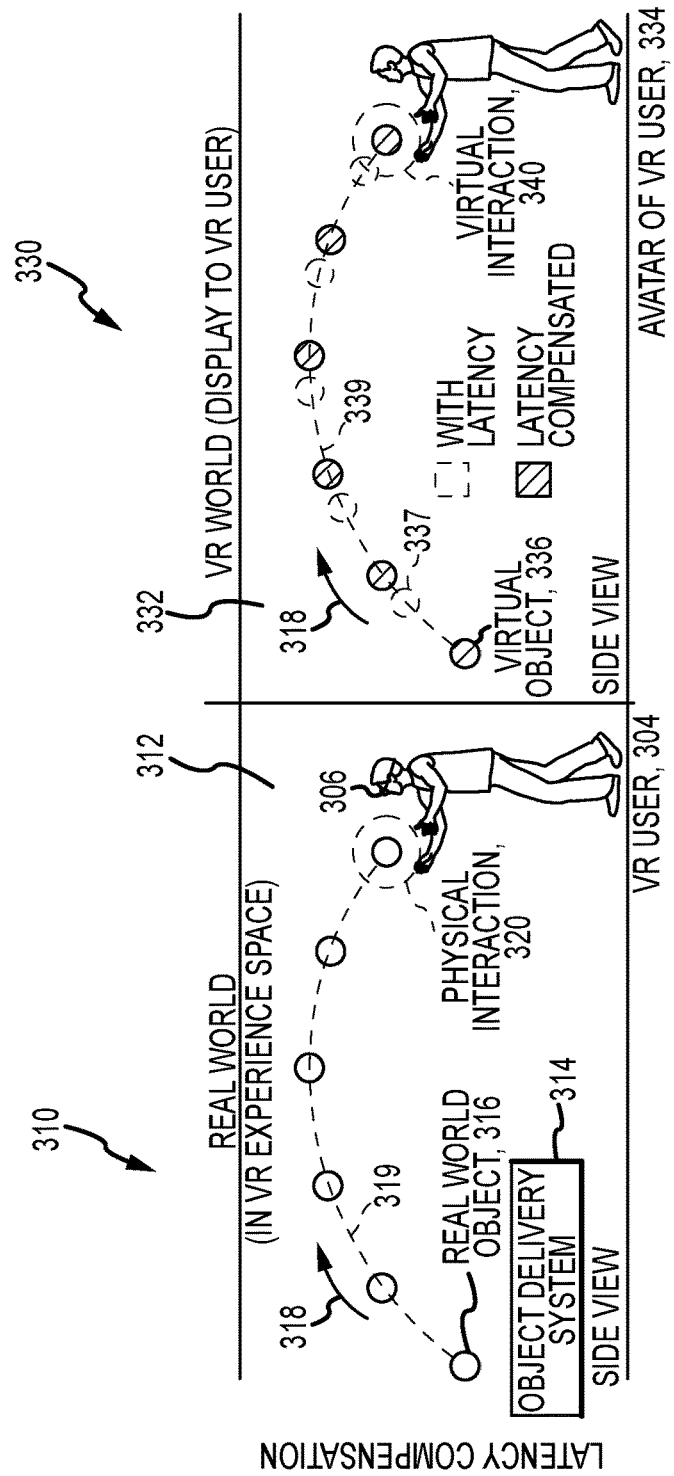
FIG. 3 illustrates, in a side-by-side arrangement, a VR experience space (i.e., the real or physical world) and the VR world displayed to a VR user during a latency compensation mode of operations of a system of the present description, such as the systems of FIGS. 1 and 2.

With systems 100 and 200 understood, it may now be useful to describe (with reference to figures) exemplary implementations of the systems 100 and 200 to provide a physical interaction to a user of a VR system. FIG. 3 illustrates, in a side-by-side arrangement, a VR experience space (i.e., the real or physical world) and the VR world displayed to a VR user during a latency compensation mode of operations of a system of the present description, such as via functioning of the latency routine 115 of the interaction module 111 in FIG. 1.

In the real/physical world 310, an object delivery system 314 is triggered (such as via a control signal from an interaction module of a VR system) to operate to pitch or propel (or drop) a real world or physical object 316 (e.g., a ball or other prop for a VR experience). The real world object 316 is shown, as a result, to fly or otherwise move 318 along a travel path 319 (e.g., to have a trajectory that can be predicted by a trajectory predication algorithm or that is known through prior operations and measurements) through the VR experience space 312 in which a user 304 is positioned and wearing a VR headset 306. The real world object 316 follows the path 319 until it enters a physical interaction zone (or until interaction with user 304) 320, such as with the user 304 catching or receiving/contacting the object 316.

The user 304 views, through their headset 306, the virtual world 330 containing a VR space 332 that includes a virtual object 336 corresponding to the physical object 316 as well as their avatar 334. The virtual object 336 is rendered such that it flies or moves 338 along a travel path 339. The virtual object 336 is rendered so as to correct for latency, which if not corrected would result in the rendering of the object 337 that is lagging behind the travel 318 of the real world object 316 along its path 319. Hence, the virtual object 336 can be said to be rendered with latency compensated visualization such that it reaches the virtual interaction zone/interaction 340 simultaneously with the physical object 316 reaching/entering the physical interaction zone/point 320 in the VR experience space/real world 312.

For example, the object 316 may be a tennis ball that is thrown by the object delivery system 314 to travel/fly 318 along a parabolic arc/path 319. In virtual reality 330, there may be a latency in the overall system (e.g., a lag of 5 to 30 milliseconds such 15 milliseconds or the like that may be due to time required for rendering in VR). The system can be configured to predict the tennis ball's trajectory 15 milliseconds (the latency) into the future and render the virtual object 336 there on its path 339 (e.g., provide "forward rendering"), thereby negating or compensating for latency in the VR system.

Figure 4:
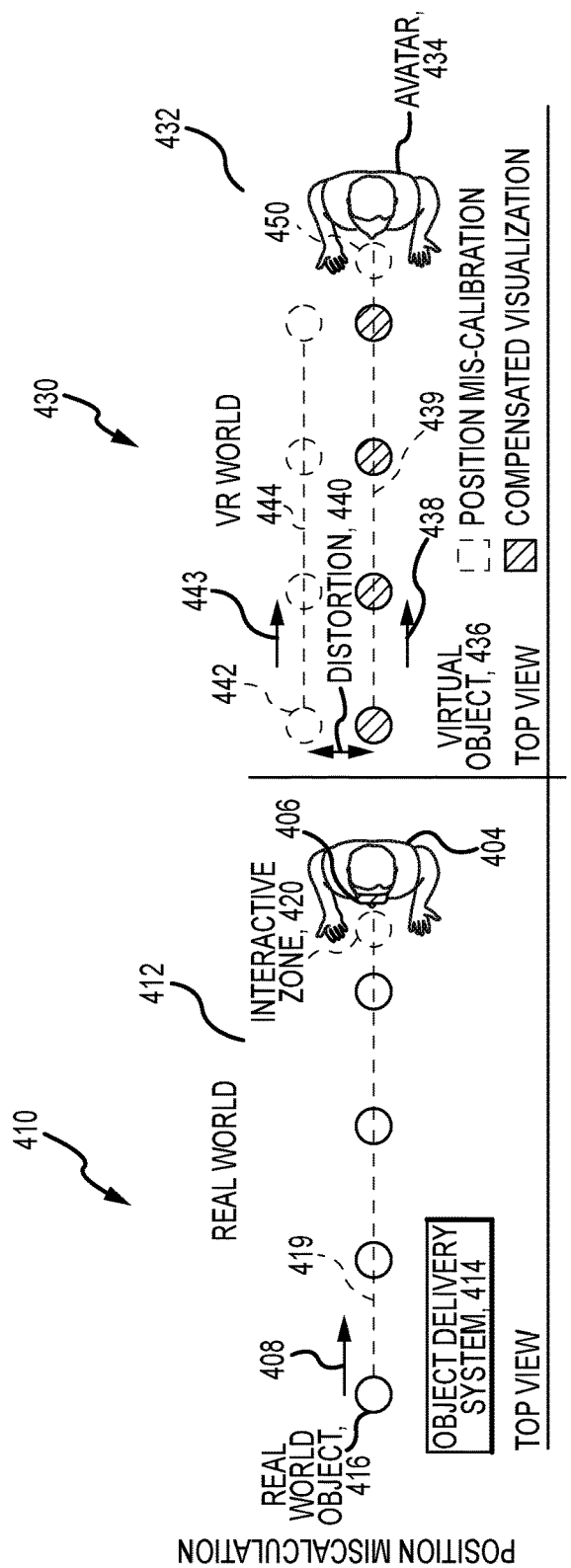
FIG. 4 illustrates, in a side-by-side arrangement, a VR experience space (i.e., the real or physical world) and the VR world displayed to a VR user during a position mis-calibration compensation mode of operations of a system of the present description, such as the systems of FIGS. 1 and 2.

FIG. 4 illustrates, in a side-by-side arrangement, a VR experience space (i.e., the real or physical world) and the VR world displayed to a VR user during a position mis-calibration compensation mode of operations of a system of the present description, such as via functioning of the position mis-calibration routine 117 of the interaction module 111 in FIG. 1.

In the real/physical world 410, an object delivery system 414 is triggered (such as via a control signal from an interaction module of a VR system) to operate to pitch or propel (or drop) a real world or physical object 416 (e.g., a ball or other prop for a VR experience). The real world object 416 is shown, as a result, to fly or otherwise move 418 along a travel path 419 (e.g., to have a trajectory that can be predicted by a trajectory predication algorithm or that is known through prior operations and measurements) through the VR experience space 412 in which a user 404 is positioned and wearing a VR headset 406. The real world object 416 follows the path 419 until it enters a physical interaction zone (or until interaction with user 404) 420, such as with the user 404 catching or receiving/contacting the object 416.

The user 404 views, through their headset 406, the virtual world 430 containing a VR space 432 that includes their avatar 434 and a virtual object 436 corresponding to the physical object 416 (but that, of course, may have a different appearance). The virtual object 436 is rendered such that it flies or moves 438 along a travel path 439. The virtual object 436 is rendered so as to correct for distortion 440 (or position mis-calibration), which if not corrected would result in the rendering of the object 442 that is offset in some direction from the position of the real world object 416 the magnitude of the distortion/mis-calibration 440 along its path 419. Hence, the virtual object 436 can be said to be rendered with distortion/calibration compensated visualization such that it reaches the virtual interaction zone/interaction 450 simultaneously with the physical object 416 reaching/entering the physical interaction zone/point 420 in the VR experience space/real world 412 and in the correct position or location within the virtual world 432 (i.e., in the virtual interaction zone/point 450 that matches the zone/point 420).

For example, the object 416 may be a tennis ball that is thrown by the object delivery system 414 to travel/fly 418 along a parabolic arc/path 419. In virtual reality 430, there may be a position mis-calibration so that the real ball 416 is a few degrees or some offset distance to the left (or some other direction) of what is seen in the VR space 432 (i.e., the virtual object 442 with position mis-calibration). The system can be configured to adjust the trajectory of the virtual ball 436 to the right (or other direction) to eliminate this mis-calibration as shown as the object 436 is displayed traveling 438 along path 439 rather than path 444.

Figure 5:
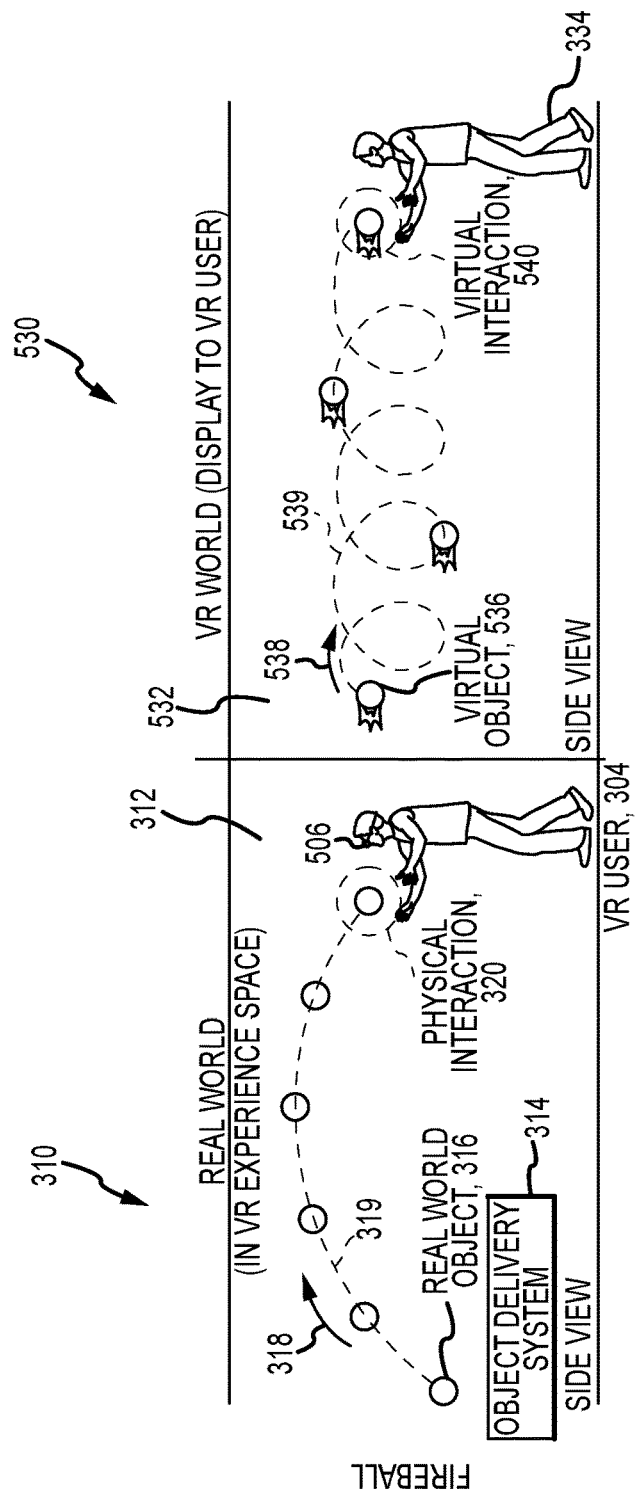
FIG. 5 illustrates, in a side-by-side arrangement, a VR experience space (i.e., the real or physical world) and the VR world displayed to a VR user during a fireball (or first special effect) mode of operations of a system of the present description, such as the systems of FIGS. 1 and 2.

FIG. 5 illustrates, in a side-by-side arrangement, a VR experience space (i.e., the real or physical world) and the VR world displayed to a VR user during a fireball (or first exemplary special effects) mode of operations of a system of the present description, such as via functioning of the fireball routine 119 of the interaction module 111 in FIG. 1.

As with the operations of FIG. 3, in the real/physical world 310, an object delivery system 314 is triggered (such as via a control signal from an interaction module of a VR system) to operate to pitch or propel (or drop) a real world or physical object 316 (e.g., a ball or other prop for a VR experience). The real world object 316 is shown, as a result, to fly or otherwise move 318 along a travel path 319 (e.g., to have a trajectory that can be predicted by a trajectory predication algorithm or that is known through prior operations and measurements) through the VR experience space 312 in which a user 304 is positioned and wearing a VR headset 506. The real world object 316 follows the path 319 until it enters a physical interaction zone (or until interaction with user 304) 320, such as with the user 304 catching or receiving/contacting the object 316.

The VR headset 506 and system are operated to create the virtual world 530 containing a VR effect where a virtual object 536 is generated with an appearance (e.g., a fireball) that differs from the real world object's appearance and with a trajectory that differs from that of the real world object 316. As shown, the user 304 views through their headset 506 a VR space 532 that includes a virtual object 536 corresponding to the physical object 316 but being presented as a fireball rather than a conventional ball. The virtual object 536 is rendered such that it flies or moves 538 along a travel path 539. The trajectory of the virtual object 536 is generated so that the virtual object 536 (a fireball in this example but may take nearly any form desired for the virtual world 530) arrives in a virtual interaction zone/point 540 concurrently with or at the same time/simultaneous (e.g., within 5 milliseconds and preferably within 3 milliseconds) as the real object 316 reaching the interaction zone/point 320 in the VR experience space 312. For example, the object 316 may be a tennis ball that is thrown by the object delivery system 314 to travel/fly 318 along a parabolic arc/path 319. In virtual reality 530, the virtual object 536 is a fireball following a spiraling but linear path 539 toward the user 304 to be caught by the user 304 concurrently with arrival of the tennis ball 316 at the user's hand (or game equipment worn or held by the user 304).

Figure 6:
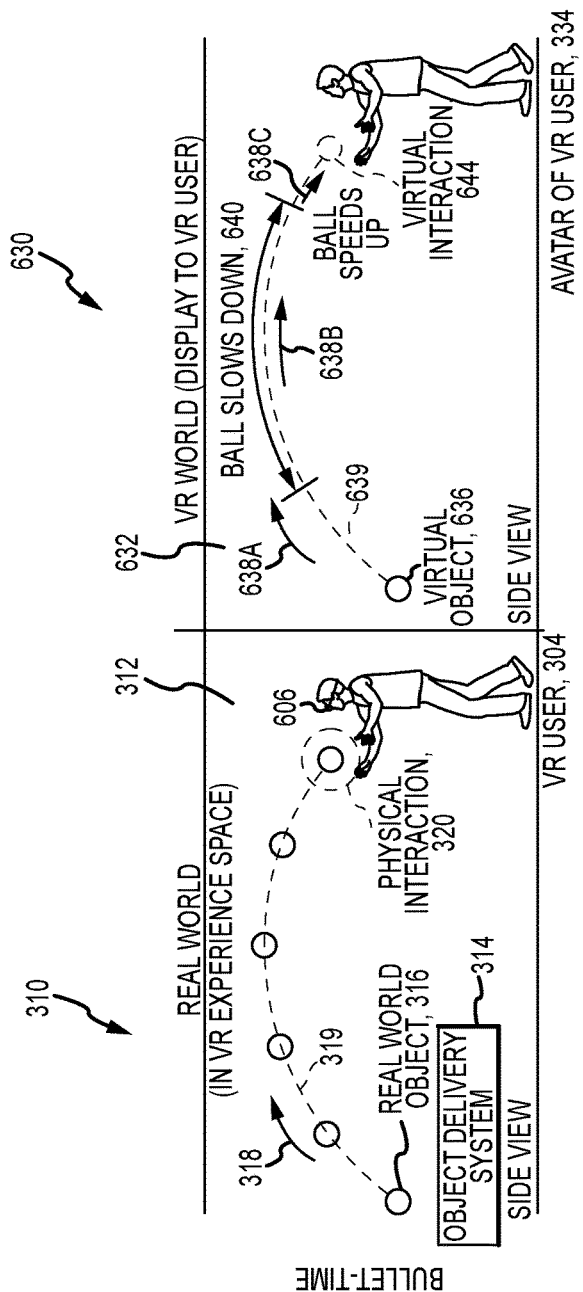
FIG. 6 illustrates, in a side-by-side arrangement, a VR experience space (i.e., the real or physical world) and the VR world displayed to a VR user during a time-morphing or bullet-time (or second special effect) mode of operations of a system of the present description, such as the systems of FIGS. 1 and 2.

FIG. 6 illustrates, in a side-by-side arrangement, a VR experience space (i.e., the real or physical world) and the VR world displayed to a VR user during a time-morphing or bullet-time (or second exemplary special effects) mode of operations of a system of the present description, such as via functioning of the bullet-time routine 121 of the interaction module 111 in FIG. 1.

As with the operations of FIG. 3, in the real/physical world 310, an object delivery system 314 is triggered (such as via a control signal from an interaction module of a VR system) to operate to pitch or propel (or drop) a real world or physical object 316 (e.g., a ball or other prop for a VR experience). The real world object 316 is shown, as a result, to fly or otherwise move 318 along a travel path 319 (e.g., to have a trajectory that can be predicted by a trajectory predication algorithm or that is known through prior operations and measurements) through the VR experience space 312 in which a user 304 is positioned and wearing a VR headset 606. The real world object 316 follows the path 319 until it enters a physical interaction zone (or until interaction with user 304) 320, such as with the user 304 catching or receiving/contacting the object 316.

The VR headset 606 and system are operated to create the virtual world 630 containing a VR effect where a virtual object 636 is generated with an appearance that may match or differ from the real world object's appearance but with a trajectory that differs from that of the real world object 316 due to time morphing. As shown, the user 304 views through their headset 606 a VR space 632 that includes a virtual object 636 corresponding to the physical object 316 and being presented as a conventional ball or any other desired form. The virtual object 636 is rendered such that it flies or moves 638A, 638B, and 638C along a travel path 639. The trajectory of the virtual object 636 is generated so that the virtual object 636 arrives in a virtual interaction zone/point 640 concurrently with or at the same time/simultaneous (e.g., within 5 milliseconds and preferably within 3 milliseconds) as the real object 316 reaching the interaction zone/point 320 in the VR experience space 312.

However, the virtual object's trajectory is chosen such that along an initial section and a final section of the path 639 the virtual object 636 travels at first and second speeds/velocities 638A and 638C (that may match each other) and in a middle or intermediate section 640 at a third speed/velocity 638B that is less than the speeds/velocities 638A and 638C. In other words, the virtual object 636 is rendered to the viewer 304 so that it appears to be moving slower but still along the arcuate path 639 and then to speed up in the final section of the path 639 prior to entering the virtual interaction zone/point 644.

For example, the object 316 may be a tennis ball that is thrown by the object delivery system 314 to travel/fly 318 along a parabolic arc 319. In virtual reality 630, the virtual object 636 is a ball that experiences bullet time in the middle of its parabolic arc before speeding up and landing in the user's hand. The time-morphing effect may take many other forms (such as the opposite of this example with the ball speeding up in the middle of the arc and then slowing down prior to interaction) as the rendering does not have to follow laws of nature as long as the arrival of the real world object and the virtual object in the real world and virtual world interaction zones are synchronized.

Figure 7:
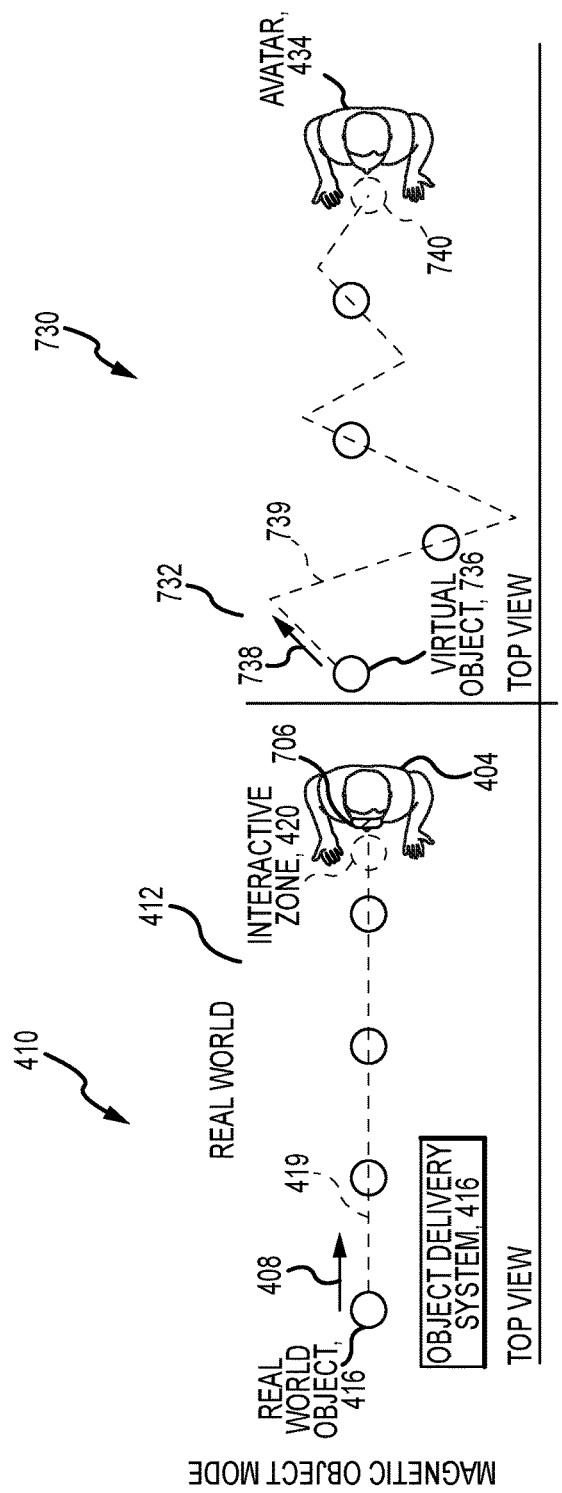
FIG. 7 illustrates, in a side-by-side arrangement, a VR experience space (i.e., the real or physical world) and the VR world displayed to a VR user during a magnetic object catching (or third special effect) mode of operations of a system of the present description, such as the systems of FIGS. 1 and 2.

FIG. 7 illustrates, in a side-by-side arrangement, a VR experience space (i.e., the real or physical world) and the VR world displayed to a VR user during a magnetic catching (or third exemplary special effects) mode of operations of a system of the present description, such as via functioning of the magnetic effects routine 123 of the interaction module 111 in FIG. 1.

As with the operations of FIG. 4, in the real/physical world 410, an object delivery system 414 is triggered (such as via a control signal from an interaction module of a VR system) to operate to pitch or propel (or drop) a real world or physical object 416 (e.g., a ball or other prop for a VR experience). The real world object 416 is shown, as a result, to fly or otherwise move 418 along a travel path 419 (e.g., to have a trajectory that can be predicted by a trajectory predication algorithm or that is known through prior operations and measurements) through the VR experience space 412 in which a user 404 is positioned and wearing a VR headset 706. The real world object 416 follows the path 419 until it enters a physical interaction zone (or until interaction with user 404) 420, such as with the user 404 catching or receiving/contacting the object 416.

The VR headset 706 and system are operated to create the virtual world 730 containing a VR effect where a virtual object 736 is generated with an appearance that may match or differ from the real world object's appearance but with a trajectory that differs from that of the real world object 416. As shown, the user 404 views through their headset 706 a VR space 732 that includes a virtual object 736 corresponding to the physical object 316 and being presented as metallic ring, boomerang, shield, or plate (or other form). The virtual object 736 is rendered such that it flies or moves 738 along a travel path 739. The trajectory of the virtual object 736 is generated so that the virtual object 736 arrives in a virtual interaction zone/point 740 concurrently with or at the same time/simultaneous (e.g., within 5 milliseconds and preferably within 3 milliseconds) as the real object 416 reaching the interaction zone/point 420 in the VR experience space 412.

However, the virtual object's trajectory is chosen such that the virtual object 736 appears to travel on a path 739 in which it moves to the left and right (or up and down) relative to a linear path to the user 404 (or a zig-zag pattern), and this may correspond with the virtual world space 732 being displayed with 3D surfaces or characters off of which the virtual object 736 is bouncing. For example, the object 416 may be a metallic shield or disk-shaped prop that is launched by the object delivery system 414 to travel/fly 418 along a parabolic arc 419 to be magnetically attached to a tool/equipment worn or held by the user (e.g., a metallic band on the user's forearm). In virtual reality 730, the virtual object 736 is also a shield/disk (or other shaped object) that ricochets off VR game characters before flying back to the user 404 and attaching to/being received or captured on the user's forearm (or a worn or held tool/weapon/piece of equipment provided as part of the VR experience along with the headset 706).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

For example, many effects were described as being potentially useful in displaying a virtual object based on a tracked physical object. While most were described in the above examples as being used independently or one-at-a-time, it will be understood that these effects (such as latency, miscalibration, trajectory warping, and the like) and others not specifically described may be combined to create a desirable virtual world experience. Further, one user 104 was shown in FIG. 1 but it will be understood that all the effects and functions described herein may occur between multiple VR users 104 with or without the use of the object delivery system 170 (e.g., two virtual users 104 may play catch with a physical object 160 and have the virtual object 134 corresponding to this object 160 be displayed differently and/or with a modified trajectory/path and the like as taught herein).

As another example, the physical interactions described often included catching an object but were described to also include other actions such as throwing an object (e.g., with unusually perfect aim, greater speed, and so on) or hitting, striking, or otherwise contacting the object (which may then be displayed in a manner that matches or differs from the real world object). With regard to throwing or "hyper throwing," the system 100 may be modified to further include an object retrieval system (not shown in FIG. 1 but readily understood by those skilled in the art), which may mirror the delivery system 170, that functions to catch or otherwise retrieve the physical object 160 thrown, struck, or otherwise moved by the user of the system 100. The object retrieval system may include one or more nets, one or more sweepers, and/or other devices to collect objects moved/thrown by the user, whether the throw was accurate or was relatively inaccurate or wild (not on target) so may be oversized to capture nearly anything dropped to floor/ground (e.g., when juggling is being performed or when throws are short/weak) or thrown outward in any direction from the user in some cases. The captured/retrieved objects may be fed to an inlet of the object delivery system 170 for later use in delivering the object 160 to the user 104.

FIG. 7 also shows that "catching" should be construed relatively broadly to include nearly any form of receiving or capturing a real world object with the VR user's body parts or with one or more implements worn or handheld or other otherwise associated with the user (which may have their positions known or tracked in real time for display as part of the virtual world by the VR system). Also, the virtual world generator/engine (e.g., engine 116) may be configured to modify the virtual object trajectory and/or the displayed virtual world in response to tracked movement of the physical object. The system is acting to try to predict how the user is trying to catch or receive (or contact/strike or the like) the physical object. When the predicted trajectory combined with the user's movements to catch/receive the object are determined by the interaction module or other software to not result in a good catch or good contact, the interaction module can alone (or with the virtual world generator/engine) function to improve the likelihood of a good catch. This may involve shifting the virtual object or its trajectory to encourage the user to respond in the physical world to catch the physical object, e.g., move their hands or a handheld or worn implement to better align with the predicted trajectory of the physical object (such as by moving their hand to the left or right or up or down some determined distance).

We claim:

1. A system for providing a dynamic physical interaction to a user during a virtual reality (VR) experience in a VR experience space, comprising:
    a VR system including a headset with a display screen and a VR rendering module generating a video output, wherein the display screen displays an image of a virtual world based on the video output;
    a physical object moving in the VR experience space toward the user wearing the headset; and
    in the VR system, an interaction module generating a predicted trajectory for the physical object in the VR experience space,
    wherein the image of the virtual world includes an image of a virtual object corresponding to the physical object,
    wherein the image of the virtual object is rendered such that the image of the virtual object moves along a travel path in the virtual world,
    wherein the image of the virtual object follows a virtual object trajectory as the image of the virtual object moves along the travel path in the virtual world that differs in at least one aspect from the predicted trajectory for the physical object in the VR experience space, and
    wherein the virtual object trajectory is time synchronized with the predicted trajectory whereby a virtual interaction between the user and the virtual object in the virtual world occurs simultaneously with a physical interaction between the user and the physical object in the VR experience space.

2. The system of claim 1, further comprising an object delivery system moving the physical object in the VR experience space, wherein the interaction module includes a trajectory prediction algorithm generating the predicted trajectory based on design parameters and location of the object delivery system and based on physical characteristics of the physical object.

3. The system of claim 1, further including a tracking mechanism tracking movement of the physical object in the VR experience space and wherein the interaction module updates the predicted trajectory by processing the tracked movement.

4. The system of claim 1, wherein the VR system has a latency in generating the video output and wherein the video output is generated using forward rendering of the virtual object on the virtual object trajectory to correct for the latency.

5. The system of claim 1, wherein the headset has position mis-calibration of the displayed image and wherein the virtual object trajectory is generated to reposition the virtual object in the virtual world based on the position mis-calibration.

6. The system of claim 1, wherein the virtual object trajectory includes at least two velocities for the virtual object along the travel path and wherein at least one of the two velocities differs from a velocity for the physical object defined in the predicted trajectory for the physical object in the VR experience space.

7. The system of claim 1, wherein the VR system further includes a tracking mechanism for tracking a movement of a body part of the user or of a physical object worn or held by the user and wherein the virtual object trajectory is modified in response to the tracked movement, whereby the VR system operates to guide the user to interact with the physical object in the VR experience space.

8. The system of claim 2, wherein the object delivery system delivers by the physical object by pitching or dropping the physical object such that the physical object is untethered as it flies or falls along a travel path through the VR experience space.

9. A system for providing a dynamic physical interaction to a user during a virtual reality (VR) experience in a VR experience space, comprising:
    a VR rendering module generating a video of a virtual world;
    a headset, wearable by a participant in the VR experience, with a screen displaying the video of the virtual world;
    a tracking system for tracking velocity and location of at least one portion of a body of the participant in a space;
    a physical object moving in the space, wherein the VR rendering module operates to include an image of a virtual object in the virtual world based corresponding to the physical object and an image of a virtual body part corresponding to the at least one portion of the body of the participant based on the velocity and the location from the tracking system; and
    an interaction module determining a predicted trajectory for the physical object in the space, wherein the VR rendering module generates the video of the virtual world with the virtual object following a virtual object trajectory that differs from the predicted trajectory as the virtual object is rendered to move along a travel path in the virtual world toward or away from the image of the virtual body part.

10. The system of claim 9, wherein the VR rendering module has a latency in generating the video of the virtual world and wherein the video of the virtual world is generated using forward rendering of the virtual object based on the virtual object trajectory to correct for the latency.

11. The system of claim 9, wherein the headset has position mis-calibration of the displayed image and wherein the virtual object trajectory is generated to reposition the virtual object in the virtual world based on the position mis-calibration.

12. The system of claim 9, wherein the virtual object trajectory includes a travel path for the virtual object in the virtual world that differs from a travel path for the physical object defined by the predicted trajectory for the physical object in the space.

13. The system of claim 9, wherein the virtual object trajectory includes at least two velocities for the virtual object along a travel path and wherein at least one of the two velocities differs from a velocity for the physical object defined in the predicted trajectory for the physical object in the space.

14. The system of claim 9, wherein the VR system further includes a tracking mechanism for tracking a movement of a body part of the participant or of a physical object worn or held by the participant and wherein the virtual object trajectory is modified in response to the tracked movement, whereby the system operates to guide the participant to interact with the physical object in the space.

15. The system of claim 9, wherein the virtual object trajectory is time synchronized with the predicted trajectory whereby a virtual interaction between the participant and the virtual object in the virtual world occurs simultaneously with a physical interaction between the participant and physical object in the space.

16. A system for providing a dynamic physical interaction to a user during a virtual reality (VR) experience in a VR experience space, comprising:
 a VR system including a headset with a display screen and a VR rendering module generating a video output, wherein the display screen displays an image of a virtual world based on the video output;
 an object delivery system delivering a physical object into the VR experience space to move toward the user wearing the headset; and
 in the VR system, an interaction module generating a predicted trajectory for the physical object in the VR experience space,
 wherein the image of the virtual world includes an image of a virtual object corresponding to the physical object,
 wherein the image of the virtual object follows a virtual object trajectory in the virtual world as the image of the virtual object is rendered to move along a travel path in the virtual world,
 wherein the object delivery system delivers by the physical object by launching or by dropping the physical object such that the physical object is untethered as it flies or falls along a travel path through the VR experience space,
 wherein the travel path for the virtual object differs in at least one aspect from a travel path for the physical object defined by the predicted trajectory for the physical object in the VR experience space, and
 wherein the virtual object trajectory is time synchronized with the predicted trajectory whereby a virtual interaction between the user and the virtual object in the virtual world occurs simultaneously with a physical interaction between the user and the physical object in the VR experience space.

17. The system of claim 16, wherein the VR system has a latency in generating the video output, wherein the video output is generated using forward rendering of the virtual object on the virtual object trajectory to correct for the latency, wherein the headset has position mis-calibration of the displayed image, and wherein the virtual object trajectory is generated to reposition the virtual object in the virtual world based on the position mis-calibration.

18. The system of claim 16, wherein the virtual object trajectory includes at least two velocities for the virtual object along a travel path and wherein at least one of the two velocities differs from a velocity for the physical object defined in the predicted trajectory for the physical object in the VR experience space.

19. The system of claim 16, wherein the VR system further includes a tracking mechanism for tracking a movement of a body part of the user or of a physical object worn or held by the user and wherein the virtual object trajectory is modified in response to the tracked movement, whereby the VR system operates to guide the user to interact with the physical object in the VR experience space.

* * * * *